United States Patent [19]

Kaneko

[11] Patent Number: 4,969,613
[45] Date of Patent: Nov. 13, 1990

[54] BAIL ARM ROLLER SUPPORTER IN FISHING SPINNING REEL

[75] Inventor: Kyoichi Kaneko, Tokyo, Japan

[73] Assignee: Daiwa Seiko, Inc., Tokyo, Japan

[21] Appl. No.: 254,924

[22] Filed: Oct. 7, 1988

[30] Foreign Application Priority Data

Oct. 9, 1987 [JP] Japan .................... 62-155494[U]

[51] Int. Cl.5 ............................................ A01K 89/01
[52] U.S. Cl. .................................................. 242/231
[58] Field of Search ............... 242/84.1 N, 84.2 C, 242/84.2 E, 84.2 G, 84.2 R, 230, 231, 233, 234; 384/547, 517, 540, 547, 563

[56] References Cited

U.S. PATENT DOCUMENTS

| 1,598,215 | 8/1926 | Montine | 384/547 |
| 2,728,534 | 12/1955 | Wallace | 242/231 |
| 2,938,757 | 5/1960 | Pieper | 384/547 |
| 3,501,208 | 3/1968 | Kessler | 384/547 |
| 3,782,779 | 1/1974 | Britnell | 384/547 |
| 3,788,570 | 1/1974 | Yamazaki | 242/311 |
| 4,195,793 | 4/1980 | Stiner | 242/84.2 R |
| 4,196,868 | 4/1980 | Puryear et al. | 242/84.2 G |
| 4,202,508 | 5/1980 | Ishida et al. | 242/84.2 G |
| 4,208,020 | 1/1980 | Gifford | 242/84.2 G |
| 4,216,921 | 8/1980 | Puryear | 242/84.2 R |
| 4,562,976 | 1/1986 | Ban | 242/231 |
| 4,602,875 | 7/1986 | Doerr et al. | 384/547 |

FOREIGN PATENT DOCUMENTS

| 30149 | 8/1974 | Japan . | |
| 158040 | 12/1981 | Japan . | |
| 194680 | 12/1983 | Japan . | |
| 498460 | 1/1939 | United Kingdom | 242/232 |

Primary Examiner—Katherine Matecki
Attorney, Agent, or Firm—Cushman, Darby & Cushman

[57] ABSTRACT

A bail arm roller supporter in fishing spinning reel is disclosed which comprises an arm lever; a support shaft provided on the arm lever; a roller rotatably supported by the support shaft through a rolling bearing having an inner race and an outer race; a first engaging portion provided at one end of the support shaft for supporting the inner race; and a second engaging portion for supporting the outer race. The second engaging portion is provided on an inner circumferential surface of the roller at the other end of the supporting shaft.

6 Claims, 2 Drawing Sheets

BAIL ARM ROLLER SUPPORTER IN FISHING SPINNING REEL

BACKGROUND OF THE INVENTION

1. Field of the Invention

The present invention relates to an improvement in a bail arm roller supporter provided on an arm lever in a fishing spinning reel.

2. Description of the Prior Art

Conventionally, a bail arm roller provided on an arm lever is rotatably supported by a support shaft through a collar or the like as shown in FIG. 4. The bail arm roller supporter however has been disadvantageous in that when the arm lever is rotated in the direction shown by an arrow A by the rotation of a rotor, the roller is moved by a fishing line in the direction shown by an arrow B so as to abut at its side surface against the disc collar mounted on the arm lever so that the roller is prevented from rotating, resulting in defects such that twisting is caused on the fishing line, damage is caused in the fishing line, frictional resistance of the roller increases to thereby reduce hoisting efficiency, and drag performance is lowered in a manner so that it becomes impossible to smoothly pull out the fishing line by drag and the difference between the drag setting tension and the hoisting-enabling tension becomes large so as to make suitable hoisting impossible, and so on.

By Japanese Utility Model Post-Exam Publication No. 49-30149, Japanese Patent Unexamined Publication No. 56-158040, Japanese Utility Model Unexamined Publication No. 58-194680, etc. known is means for preventing twisting from occurring in a fishing line by automatically changing the angle of a roller to a suitable value corresponding to the quantity of taking up and change of tension of the fishing line. In any case, however, there are problems similar to those described above in that when the fishing line is taken up, frictional resistance is applied directly onto the roller in its axial direction so that the roller cannot rotate smoothly.

SUMMARY OF THE INVENTION

It is therefore an object of the present invention to solve the problems in the prior art.

It is another object of the present invention to provide a bail arm roller supporter in which inner and outer races of a rolling bearing for supporting a roller are supported respectively by engaging portions provided on a support shaft and the roller at their sides opposite to each other respectively so that a fishing line is efficiently smoothly guided without being damaged.

In order to attain the objects described above, the bail arm roller supporter according to the present invention comprises a support shaft provided on an arm lever, and a roller rotatably supported by the support shaft through a rolling bearing which has an inner race and an outer race, the inner race being supported by a first engaging portion provided at one end of the support shaft, the outer race being supported by a second engaging portion provided on an inner circumferential surface of the roller at the other end of the supporting shaft.

DETAILED DESCRIPTION OF PREFFERRED EMBODIMENTS

Figure 1:
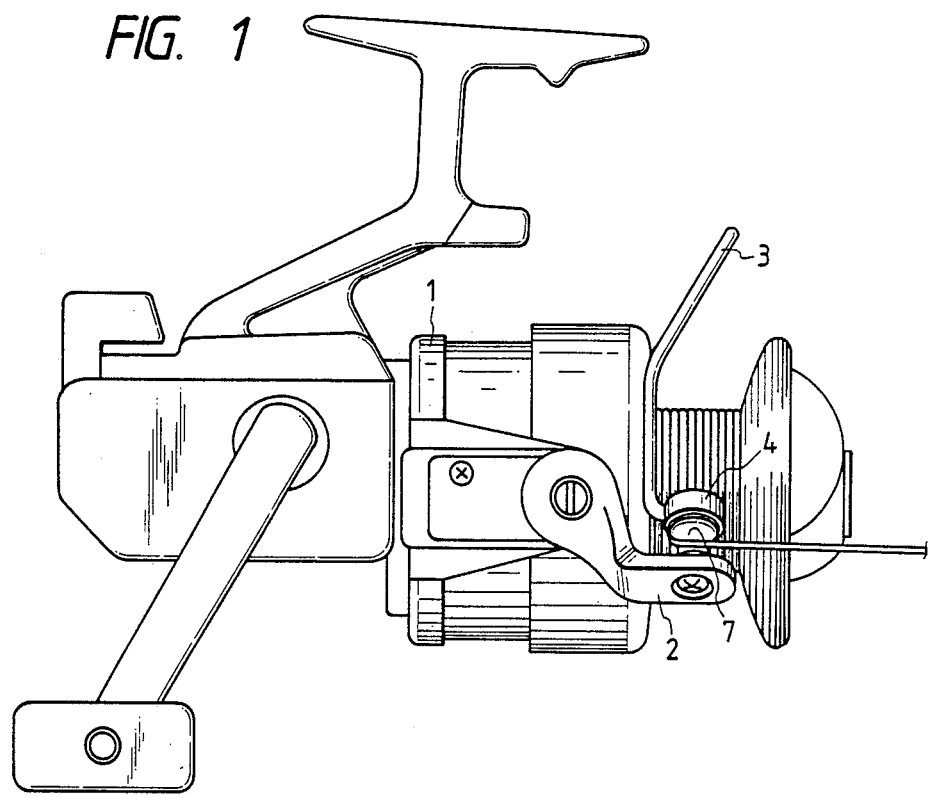
FIG. 1 is a front view showing an embodiment of the present invention.

Referring to the drawings, embodiments of the present invention will be described hereunder.

Figure 2:
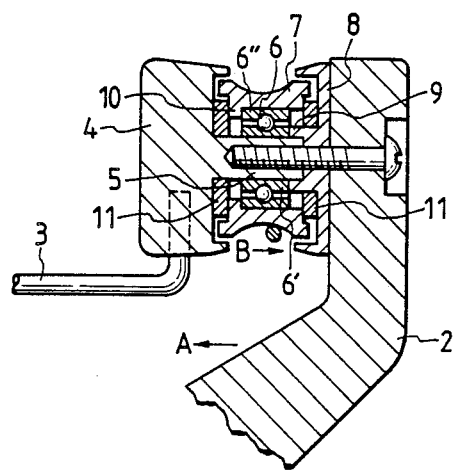
FIG. 2 is a longitudinal sectional front view of a main portion of the same.

FIGS. 1 and 2 illustrate an embodiment of the present invention. In the drawings, a support shaft 5 is provided between a top end portion of an arm lever 2 and a bail attaching member 4. The arm lever 2 is rotatably pivoted on a rotor 1 of a spinning reel in such a manner as known well. A bail 3 is fixed to the bail attaching member 4 and a roller 7 is rotatably supported by the support shaft 5 through a rolling bearing 6.

A disc-like collar 8 is provided on the support shaft 5 on the side of the arm lever 2. An annular engaging portion 9 for supporting an inner race 6' of the rolling bearing 6 is provided at a fitting portion at which the disc color 8 and the support shaft 5 are fitted to each other, and another annular engaging portion 10 for supporting an outer race 6" of the rolling bearing 6 is provided on an inner circumferential surface of the roller 7 on the side of the bail attaching member 4.

The disc collar 8 in the embodiment may be integrally formed with the arm lever 2.

In the drawings, oil-containing felt washers 11 are provided at the bearing portion to prevent dust and water from entering the bearing.

Figure 3:
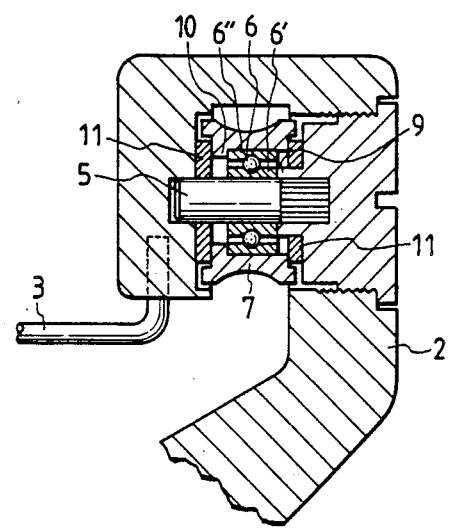
FIG. 3 is a longitudinal sectional front view showing another embodiment of the present invention.
Figure 4:
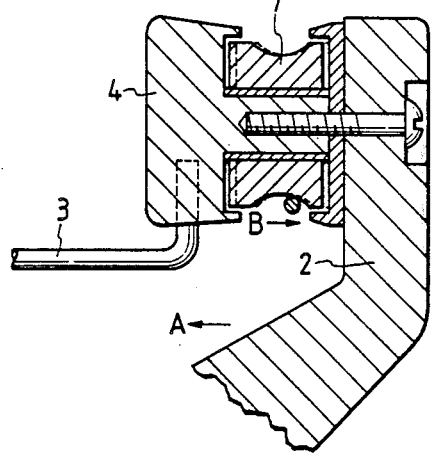
FIG. 4 is a longitudinal sectional front view showing a conventional system.

FIG. 3 shows another embodiment of the present invention in which the parts the same as those in FIGS. 1 and 2 are referenced correspondingly. In FIG. 3, the bail attaching member carrying the bail 3 fixed thereto is integrally formed with the arm lever 2, and the support portion 9 is formed directly on the arm lever 2 while the collar is omitted in this embodiment.

Figure 5:
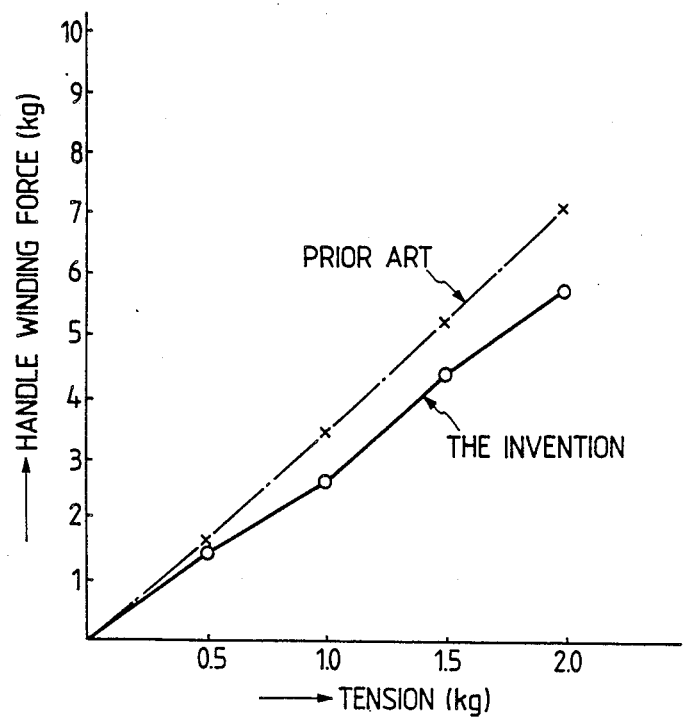
FIG. 5 shows comparative expeimental data in hoisting-efficiency in the supporter according to the present invention and the conventional supporter.

FIG. 5 shows comparative experimental data in hoisting efficiency in the apparatus according to the present invention and a conventional apparatus. It is found from the result of the experiment that the apparatus according to the present invention is better than the conventional one by about 20% in the hoisting efficiency. That is, in the case where an item having predetermined tension is hoisted up by rotating a handle, the apparatus according to the present invention can hoist up the item lighter by about 20% than the conventional one.

In the thus arranged embodiments of the present invention, a fishing line is guided to be taken up by the roller supported by the rolling bearing 6.

According to the present invention, the roller for guiding the fishing line supported by the arm lever is supported through the rolling bearing and the inner and outer races of the rolling bearing are engaged with the engaging portion provided at one end of the support shaft and with the engaging portion provided on the inner circumferential surface of the roller at the other end of the support shaft respectively. Accordingly, the bail arm roller supporter according to the present invention has superior characteristics and utility such that when a fishing line is taken up, the roller is smoothly rotated without generating frictional resistance so as not to lower the hoisting efficiency and drag performance, twisting of the fishing line is suppressed, the fishing line can be prevented from being damaged and crushed, and the other race of the rolling bearing is swung a little relative to the inner race of the same by the fishing line being taken up so as to perform automatic centering adjustment, so that twisting on the fishing line can be prevented very effectively.

I claim:

1. A bail arm roller supporter in a fishing spinning reel comprising:
   an arm lever;
   a support shaft provided on said arm lever;
   a roller having a first end and a second end rotatably supported by said support shaft through a rolling bearing having an inner race and an outer race;
   a collar supported on said support shaft and disposed between the first end of the roller and the arm lever, said collar having an axial portion and a radial portion, said radial portion extending radially from said support shaft adjacent said arm lever, said axial portion being disposed in surrounding relation to said support shaft and extending along a portion of the length thereof axially from said radial portion towards said roller;
   a first engaging portion for engaging and supporting said inner race, said first engaging portion being provided at an axial of said axial portion of said collar remote from said radial protion; and
   a second engaging portion for engaging said supporting said outer race, said second engaging portion being provided on an inner circumferential surface of said roller, said second engaging portion being axially spaced from said first engaging portion.

2. A bail arm roller supporter as in claim 1 further comprising a first washer supporter on said support shaft between said collar and said roller.

3. A bail arm roller supporter as in claim 2 further comprising a bail attaching member supported on said support shaft and having a small diameter portion disposed on said support shaft radially inward of said roller and a collar portion disposed proximate said second end of said roller.

4. A bail arm roller supporter as in claim 3 wherein a second washer is disposed between said collar portion of said bail attaching member and said second end of said roller.

5. A bail arm roller supporter in a fishing spinning reel comprising:
   an arm lever;
   a support shaft provided on said arm lever, said support shaft having a first end and a second end;
   a roller having a first end and a second end rotatably supported by said support shaft through a rolling bearing having an inner race and an outer race;
   a first engaging portion for supporting said inner race, said first engaging portion being provided at one of said first and second ends of said support shaft;
   a second engaging portion for supporting said outer race, said second engaging portion being provided on an inner circumferential surface of said roller, said second engaging portion being axially spaced from said first engaging portion;
   a first washer supported on said support shaft between said first end of said roller and said arm lever; and
   a side wall mounted to the second end of said support shaft; and
   a second washer mounted between said second end of said roller and said side wall.

6. A bail arm roller supporter as in claim 5, wherein said first and second washers each comprise oil-containing felt washers.

* * * * *